(12) United States Patent
Ganiere (10) Patent No.: US 6,676,359 B2
(45) Date of Patent: Jan. 13, 2004

(54) LIFT AND BAGGAGE RAMP

(76) Inventor: Jeff Ganiere, 330 N. Spring Blvd., Tarpon Springs, FL (US) 34689

( * ) Notice: Subject to any disclaimer, the term of this patent is extended or adjusted under 35 U.S.C. 154(b) by 90 days.

(21) Appl. No.: 10/152,694

(22) Filed: May 22, 2002

(65) Prior Publication Data

US 2003/0219329 A1 Nov. 27, 2003

(51) Int. Cl.$^7$ .............................................. B65G 67/04
(52) U.S. Cl. ..................... 414/391; 414/398; 414/571
(58) Field of Search ................................. 414/398, 399, 414/538, 571; 14/71.5, 72.5, 71.1

(56) References Cited

U.S. PATENT DOCUMENTS

| | | | | |
|---|---|---|---|---|
| 2,487,613 A | * | 11/1949 | Stone | 244/114 R |
| 4,176,732 A | * | 12/1979 | Nordskog | 187/244 |
| 5,154,569 A | * | 10/1992 | Eryou et al. | 414/495 |
| 6,109,854 A | * | 8/2000 | Thompson et al. | 414/398 |
| 6,390,757 B2 | * | 5/2002 | Ganiere | 414/391 |
| 6,401,901 B1 | * | 6/2002 | Bracken et al. | 193/38 |

* cited by examiner

Primary Examiner—Thomas J. Brahan
(74) Attorney, Agent, or Firm—Dennis G. LaPointe; Mason Law, P.A.

(57) ABSTRACT

The specification and drawings describe and show one embodiment of the present invention in the form of an inclined ramp in combination with a lifting device for lifting and lowering articles to and from the tarmac from and to the upper loading area at the top of a service stairway next to a passenger terminal bridge/walkway.

15 Claims, 8 Drawing Sheets

LIFT AND BAGGAGE RAMP

BACKGROUND OF THE INVENTION

The present invention relates generally to baggage lifting and handling equipment coupled to an elevated aircraft passenger bridge.

The use of a baggage slide outside the service door of the passenger loading bridge is to transfer baggage to/from the aircraft in an area directly adjacent to the passenger entrance to the aircraft.

Owing to a growing trend among air travelers to carry their baggage onboard instead of checking it through at the ticket counter, overhead storage locations on aircraft can become dangerously overburdened. The FAA has guidelines restricting the size and number of pieces of carry-on luggage allowed, which the agency is urging the airlines to enforce. This baggage slide allows flight attendants and ground crews to swiftly and accurately handle overflow baggage so the baggage can be transferred to the cargo area of the aircraft without causing aircraft to sustain ground delays.

In addition, in many situations disabled persons are not required to give advance notice to the airlines of their special needs, and frequently arrive for boarding at the passenger loading bridge in wheelchairs or motorized scooters. The wheelchairs and scooters must be quickly checked as cargo after the disabled person has boarded the aircraft. Similarly, the wheelchair and scooter may need to be elevated to the loading bridge upon arrival at the passenger's destination. Hence, there is a need for a baggage slide and lifting device capable of quickly and efficiently delivering baggage and other cargo, such as wheelchairs, to the cargo loading area or lifting such handicap devices to the loading bridge to assist handicapped passengers. The present invention satisfies this need.

U.S. Pat. No. 6,109,854 to Thompson, Jr. et al. discloses a ramp in an attempt to solve the above described problems. However, this baggage slide has several inherent deficiencies which limit its use due to its structure and method of attachment. Specifically, the Thompson slide has several limitations that limit its ability to accommodate the height the bridge has to be elevated to in turn accommodate the bridge connection to the aircraft access door. Thompson discloses a ramp which has an inclined portion starting at the tarmac at its lower end and terminating at the upper level first stair. The ramp is fixed to the employee auxiliary access stairway at at least two locations, one being at the top of the riser of the first step and the other being at the leading edge area of the stairway upper level platform.

From a safety standpoint, this creates shear loading and stress on the stairway assembly which could cause an accident whereby the ramp and stairway assembly separate from the bridge frame and fall to the ground.

The attachment of the present invention, on the other hand, is independent of the stairway assembly and the invention instead attaches directly to the framework of the bridge assembly. No additional load is applied to the stairway as a result of the combination lifting (elevator) means and ramp weight itself or in combination with the weight of objects sliding down the ramp or being lowered by the elevator means portion of the invention. The support cantilevered extension attaching the frame of the elevator means extends underneath the stairway landing platform. Now when the bridge needs to the elevated, the loading portion of the inclined ramp which is pivotally attached to one side of the frame of the elevator means elevates simultaneously with the bridge.

The present invention includes lifting and handling means for lifting or lowering articles such as wheelchairs or scooters. Dropping articles down a ramp such as scooters and wheelchairs can cause damage to the articles. It is safer to utilize elevator means for raising and lowering these devices to and from the loading bridge. The invention is further described in more detail below in reference to the drawings.

In the accompanying drawings:

FIG. 6a is a plan view of the platform portion of the elevator means depicting the pivotable planar plate member;

FIG. 6b is a cross-sectional view of a typical embodiment of the platform of FIG. 6a;

FIG. 6c is a cross-sectional view of another typical embodiment of the platform of FIG. 6a.

Figure 1:
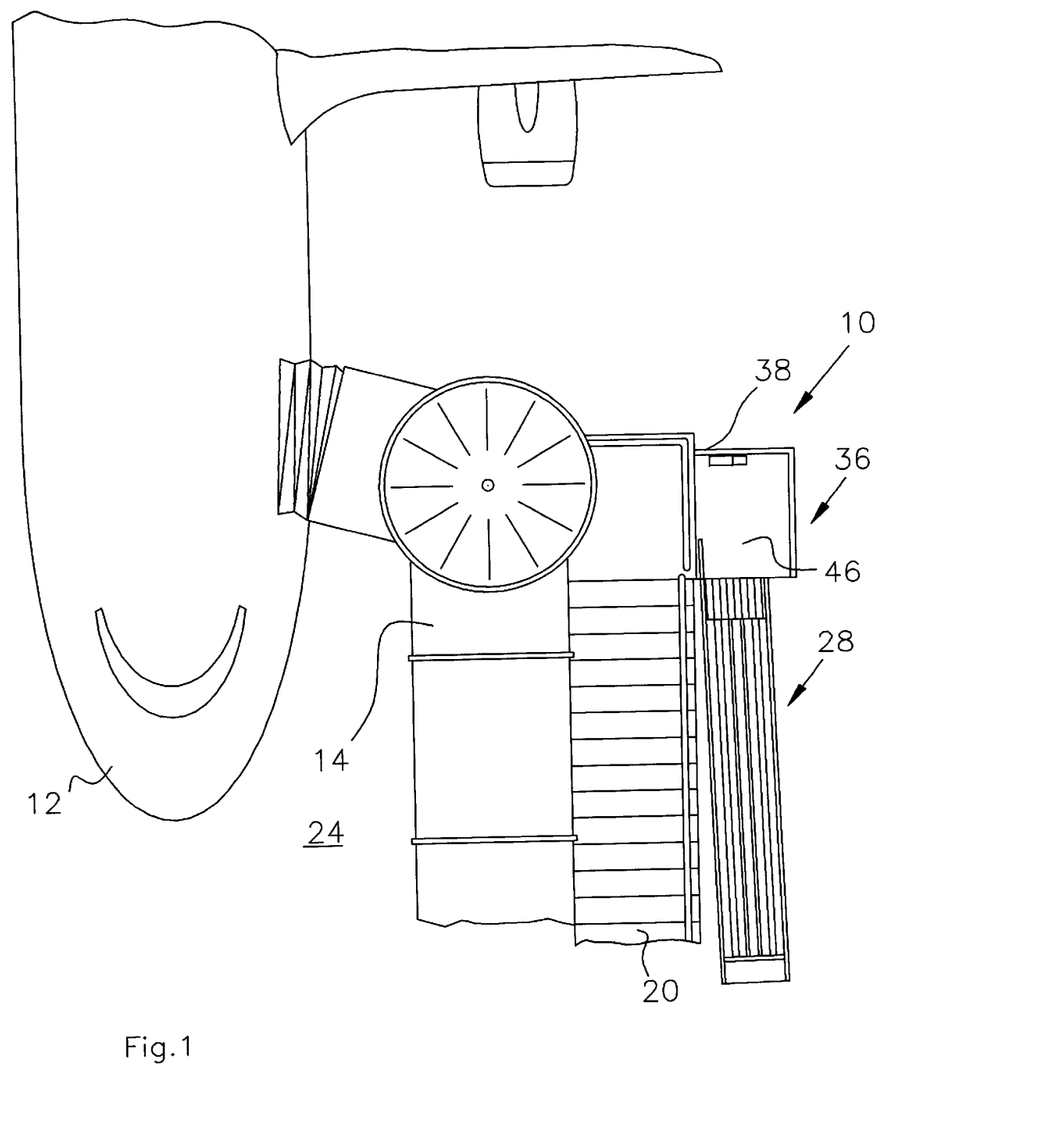
FIG. 1 is an illustrative plan view of a baggage slide of the present invention coupled to a passenger bridge connecting to an aircraft.
Figure 2:
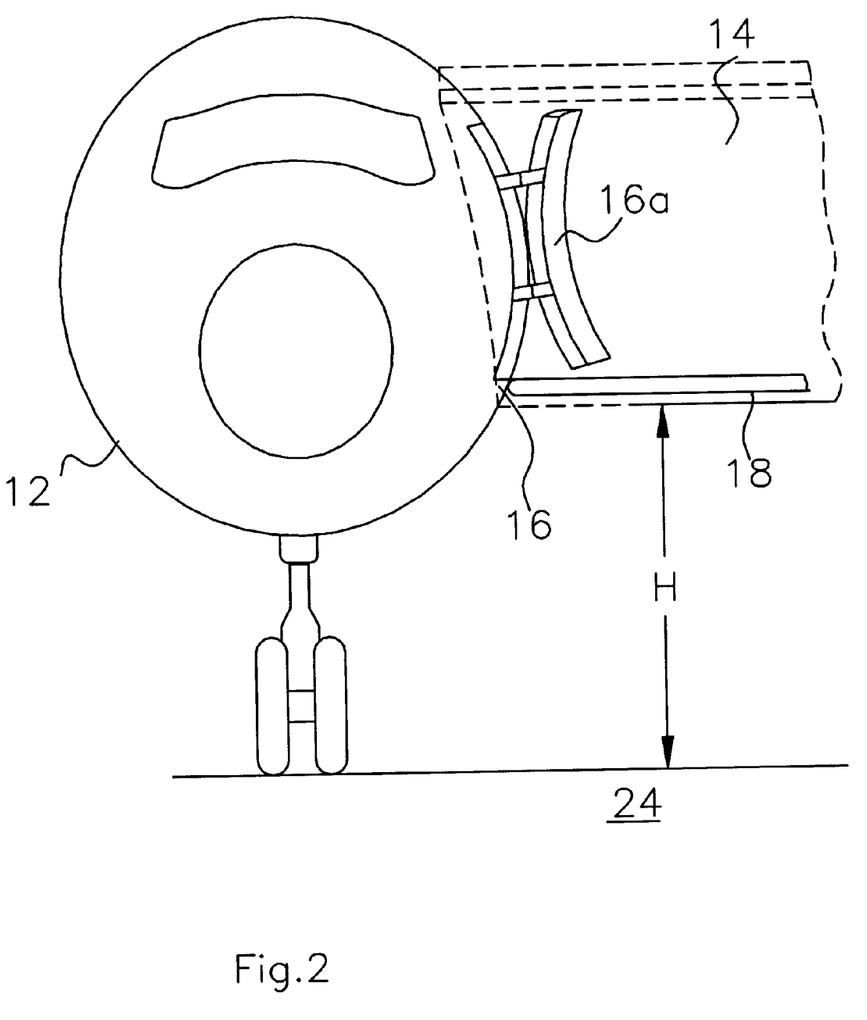
FIG. 2 is an illustrative view of a walkway surface comprising a portion of the passenger bridge of FIG. 1 positioned adjacent the door of the aircraft.
Figure 3:
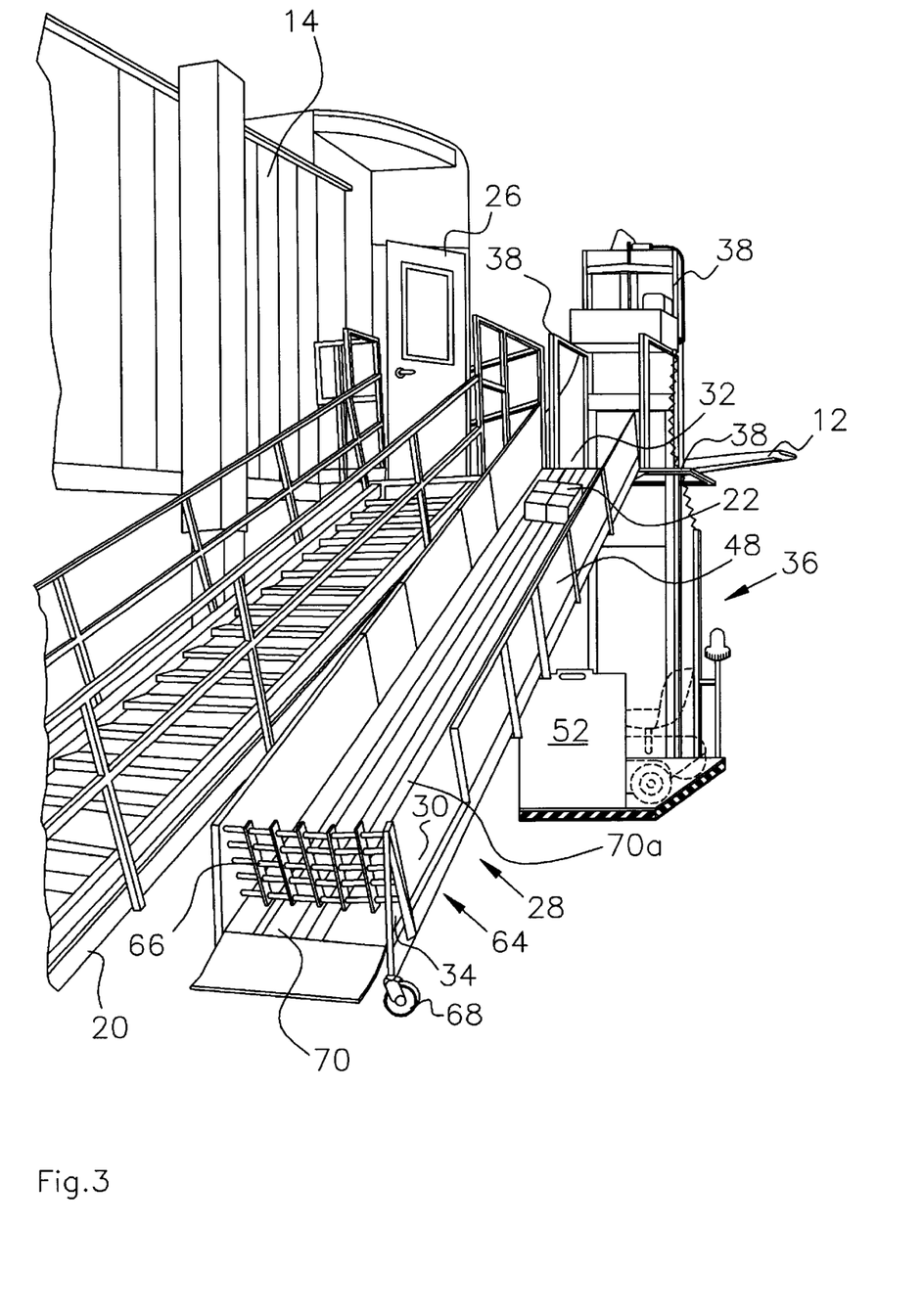
FIG. 3 is a perspective view of the invention near a service stairway part of the bridge.

Referring now to the drawings, which disclose various embodiments of the present invention, which is a lift and baggage ramp, and is depicted generally as 10. In FIGS. 1–3, there is illustrated an aircraft 12 having a moveable substantially enclosed elevated passenger walkway/passenger bridge 14 leading to the passenger entrance 16 of the aircraft. The entrance 16 is defined where the entry hatch/door 16a is located in the fuselage of the aircraft. The passenger walkway/passenger bridge 14 includes a walkway floor 18 that is aligned with the entrance 16 and allows the passage/boarding of people into and out of the aircraft 12. There are many models of aircraft and the elevation of the entrance 14 above the ground/tarmac, as indicated by "H", often varies between the models. For example, the elevation of the passenger entrance to of the DC-9 is about 9 feet, the Boeing 757 is about 13 feet 4 inches and the Boeing 747 is about 17 feet as 7 inches. The moveable passenger bridge/elevated walkway 12 is adjusted to bring the walkway floor 18 to the proper elevation to service the particular model of aircraft. Further, an auxiliary access stairway 20 and other items associated with the entrance 16 of the aircraft 12 must also be adjusted to the elevation associated with the particular model of aircraft.

The invention 10 is designed and constructed to enable articles 22 to be transported from the elevated passenger walkway/bridge 14 to the ground/tarmac 24. The term articles as utilized herein include one or a plurality of items such as but not limited to baggage, cargo, packages, gifts, and/or wheelchairs and scooters. Owing to size restrictions for "carry on" articles and the amount of available storage space within the passenger cabin, many articles must be removed from the elevated passenger walkway/passenger bridge 14 and transferred to the cargo hold of the aircraft 12. For example, a passenger boarding the aircraft 12 through the elevated passenger walkway/passenger bridge 14 may be required to store some of their "carry on" articles in the airplanes cargo hold and may do so by giving the "carry-on" article to an attendant. The article is then moved from the walkway/passenger bridge 14 through an exterior door 26 of the elevated walkway 14 to the invention 10 for movement to the ground/tarmac 24 and subsequently loaded into the cargo hold of the aircraft. Similarly, personal scooters and wheelchairs for handicapped passengers must be lowered to the tarmac for storage in the cargo area of the aircraft.

The lift and baggage ramp 10 includes elevator means 36 for lowering and lifting an article 22, such as a scooter (shown in phantom in FIG. 3). The elevator means 36 includes a frame 38 from which a loading end 32 of an inclined ramp 28 is pivotally attached similar to that depicted as 40 to a portion of said frame 38.

Figure 7:
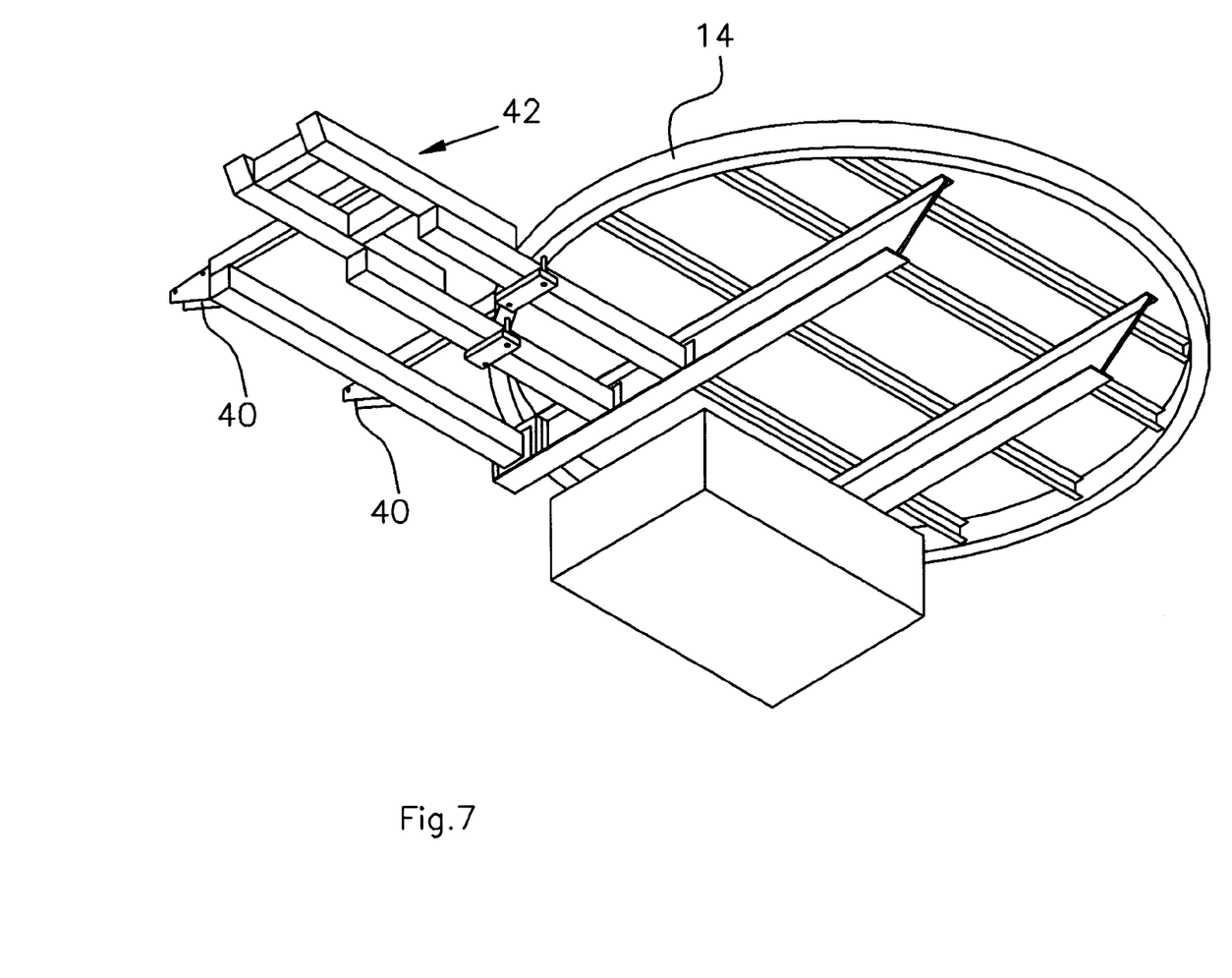
FIG. 7 is a depiction of a conceptual example of a cantilever attachment support means extending from the bridge structure and from which the invention is supported.

The frame 38 of the elevator means 36 further has cantilevered attachment and support means 42 (see FIG. 7) for fixing said frame 38 of said elevator means 36 to the movable elevated passenger walkway/bridge 14, with the cantilevered attachment and support means 42 extending from the elevated passenger walkway/bridge 14 adjacent an underneath side of an auxiliary access stairway's upper portion landing platform 44 to the frame 38.

The elevator means 36 includes a generally planar platform 46 for loading the article 22, wherein the planar platform 46 is capable of being lifted from the tarmac 24 to a level which approximately coincides with the upper portion landing platform 44 of the auxiliary access stairway 20 and wherein the planar platform 44 is capable of being lowered from the level which approximately coincides with the upper portion landing platform 44 of the auxiliary access stairway 20 down to the tarmac 24.

The inclined ramp 28 includes an unloading end 34 resting on a tarmac surface 24 with a generally planar conveyance surface 30 extending between the unloading end 34 and the loading end 32 for the sliding conveyance of another article 22 from said loading end 32 to said unloading end 34.

The inclined ramp 28 is disposed near and generally parallel to the auxiliary access stairway 20, and further includes upstanding side walls 48 generally along each edge of the generally planar conveyance surface 30, the upstanding side walls 48 serving as means for preventing the sliding article 22 from falling off the generally planar conveyance surface 30.

As shown in FIGS. 4a and 6a–6c, the generally planar platform 46 preferably also includes a raised edge 50 along a side of said generally planar platform 46 furthest away from said upper portion landing platform 44 of the auxiliary access stairway 20 when said generally planar platform 46 is the elevated position. This raised edge 50 may also be incorporated in the form of a generally tapered raised portion 50a.

In another preferred application of the present invention 10, the generally planar platform 46 may also have a raised edge 50 along a side of said generally planar platform 46 adjacent said upper portion landing platform 44 of the auxiliary access stairway 20 when said generally planar platform 46 is the elevated position. A tapered raised portion 50a may also optionally be formed on this side of the platform 46.

Figure 5:
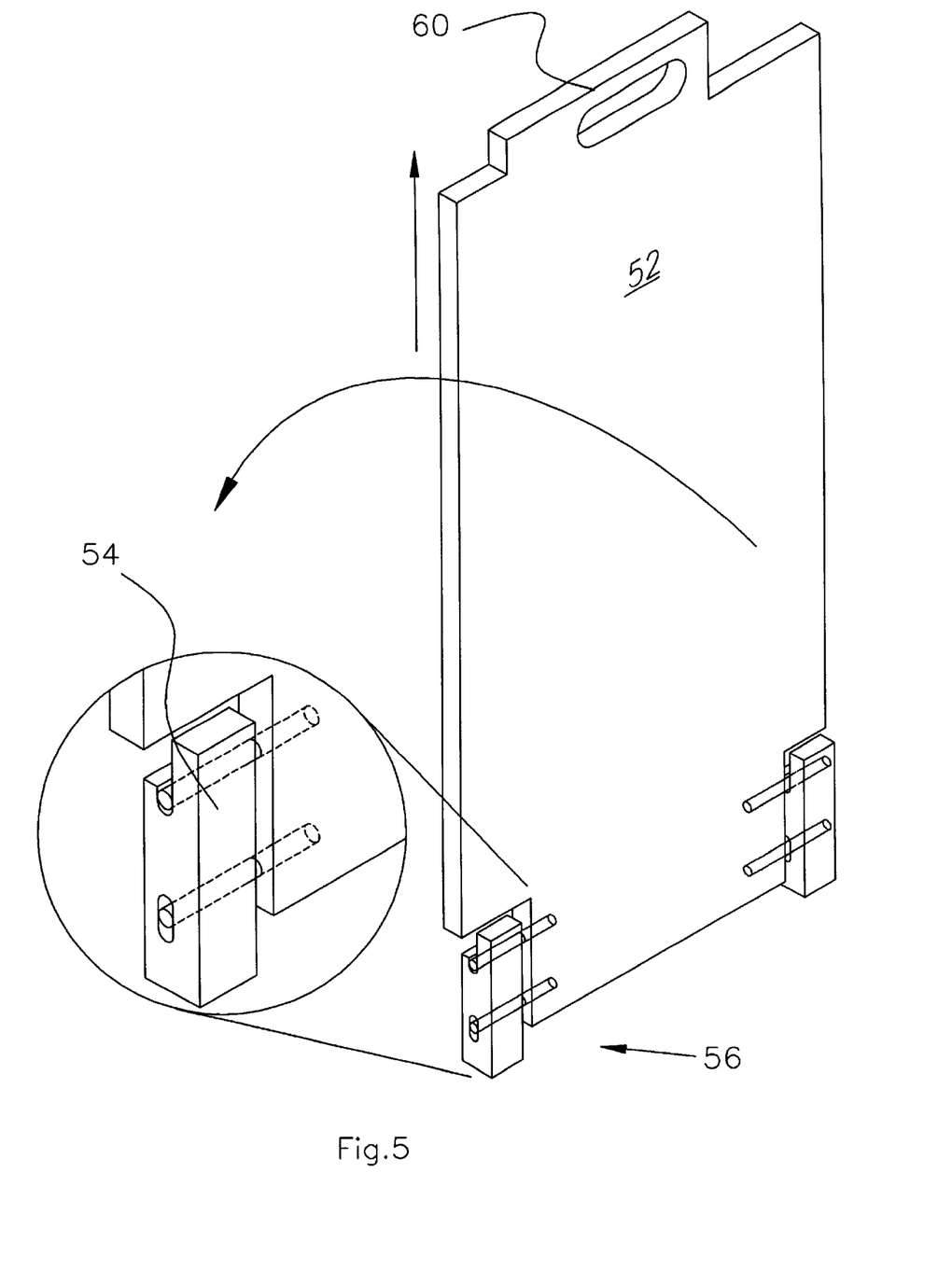
FIG. 5 is a depiction of the pivotable plate member with an exploded view of one typical application for providing pivot means and for maintaining the plate member in a generally vertical orientation.

The elevator means 36 preferably also has a generally planar member 52 pivotally attached (see 54 in FIG. 5) to a side of the generally planar platform 46 of the elevator means 36, the pivotal attachment 54 being on the side adjacent the loading end 32 of the inclined ramp 28 when said generally planar platform 46 is in the elevated position. In this embodiment, the generally planar member 52 is capable of pivoting from a generally vertical orientation as shown in FIG. 3 down toward the generally planar platform 46 to one of a generally horizontal orientation parallel to the generally planar platform 46 and an inclined orientation above the generally planar platform 46 as shown in FIG. 5, such that when the generally planar platform 46 is lifted to the level coinciding with the upper portion landing platform 44 of the auxiliary access stairway 20, the generally planar member 52 may be selectively lowered to the horizontal or inclined orientation or remain in the vertical orientation. The generally planar member 52 when in the vertical orientation further serves as a guard to prevent the article 22 being elevated from falling off the generally planar platform 46.

Figures 6A, 6B:
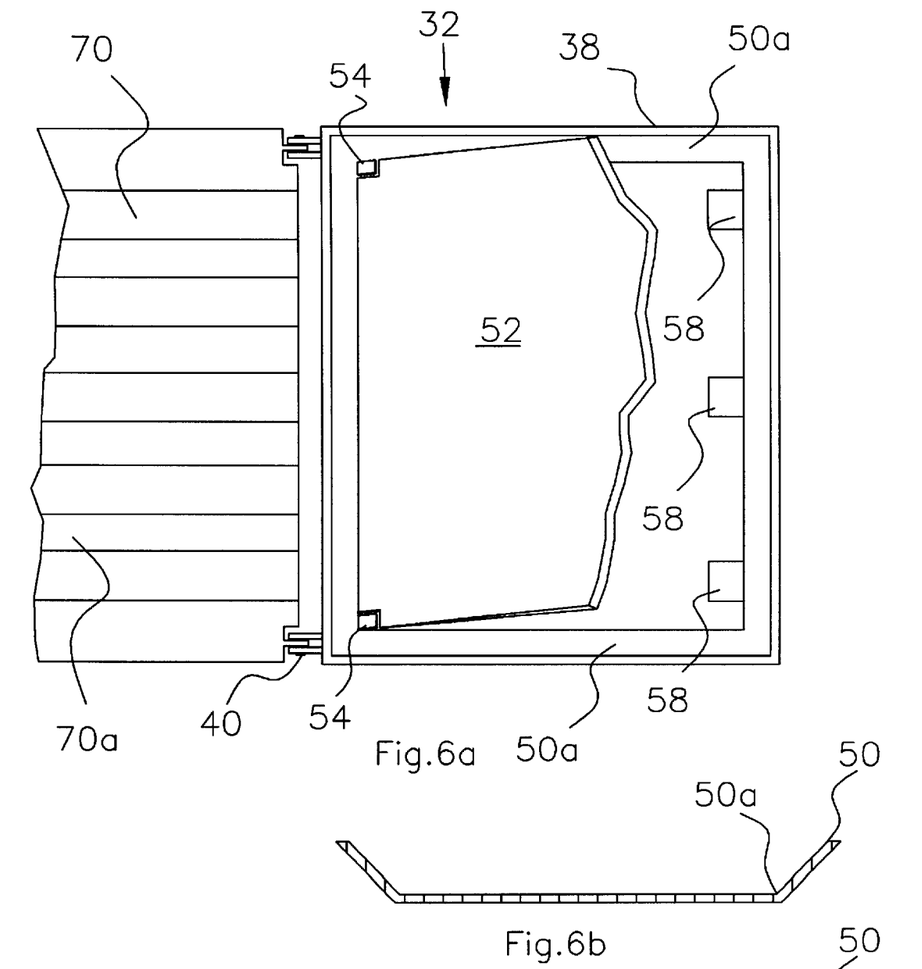
Figure 6C:
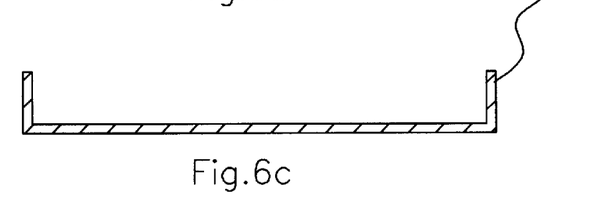

As mentioned in the preceding paragraph, in another practical application of the above described embodiment, the elevator means 36 further comprises means 56 for maintaining the generally planar member in the vertical orientation and means 58 for maintaining the generally planar member 52 in the one of the horizontal orientation and inclined orientation. As shown in FIGS. 5 and 6a, one possible method of providing means 56 is a plate or boss attached near the edge and toward each corner of the generally planar platform 46 with a slotted opening which allows for the vertical travel of a pin or peg extending from the planar member 52. Parallel pins or pegs spaced apart from the first pins could rest in a partial slotted area at the top of each plate or boss. A ground crew member need only lift the planar member 52 to disengage the pins from the partial slotted portions and then lower the planar member 52 toward the planar platform 46.

As mentioned above, the elevator means 36 preferably includes means 58 for maintaining the generally planar member 52 in the one of the horizontal orientation and inclined orientation. As shown in FIG. 6a, one method of providing means 58 is to incorporate one or more boss(es) or plate(s) so that the side opposite the pivot side of the planar member 52 can be lowered to rest thereupon. The planar member 52 when in a lowered position then serves as a ramp extension for the inclined ramp 28. Boss(es) 58 could have variable heights or be otherwise adjustable in height to allow member 52 to have an inclined orientation if desired.

Figure 4A:
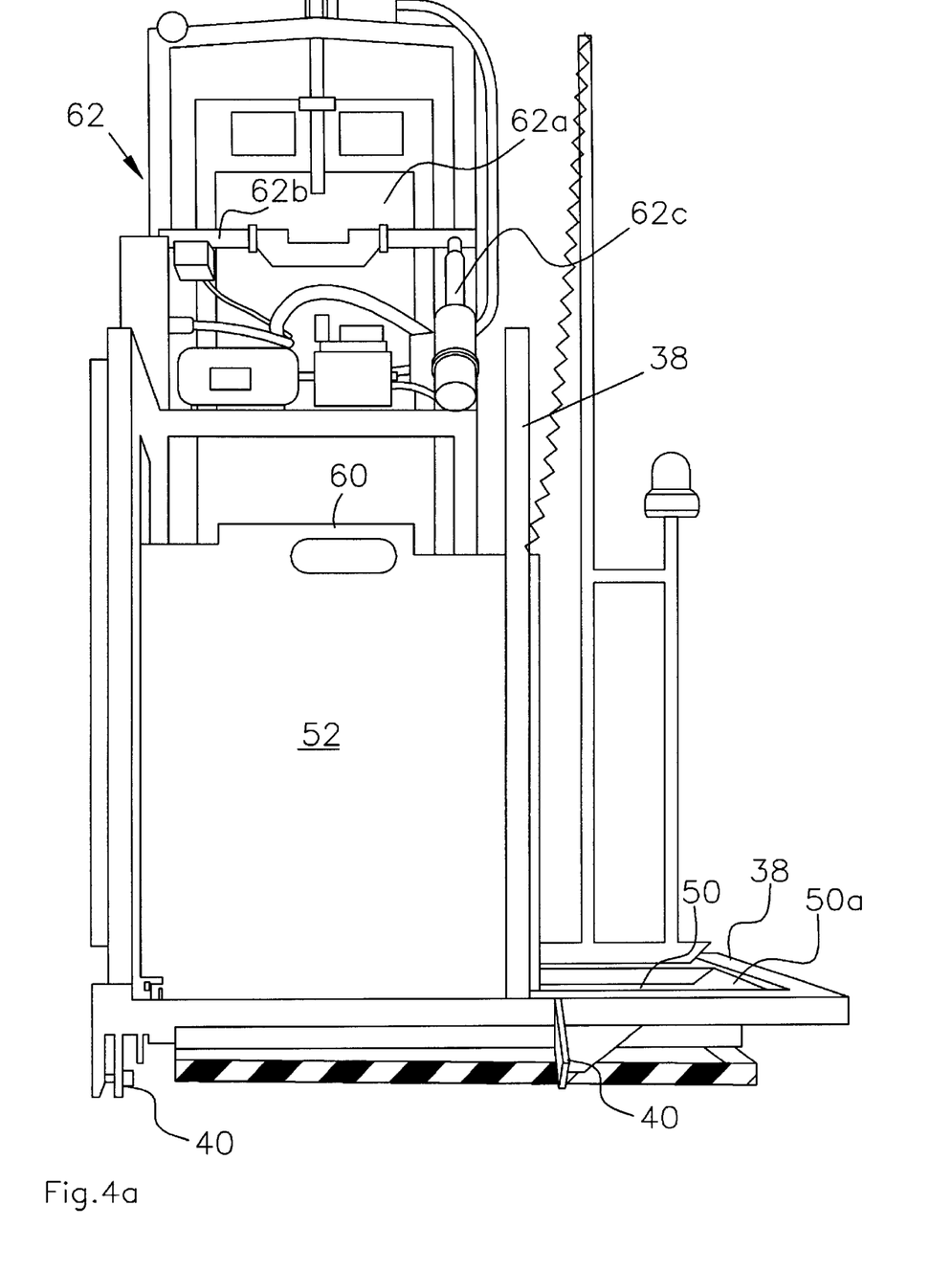
FIG. 4a is an elevation view of a typical application of the elevator means.

The planar member 52 preferably has handle means 60 for facilitating the selective positioning of the generally planar member 52 in the one of the horizontal and inclined orientations or the vertical orientation. The handle means 60 may be provided in a number of ways known in the art with the simplest being an aperture as depicted in FIG. 4a.

Figure 4B:
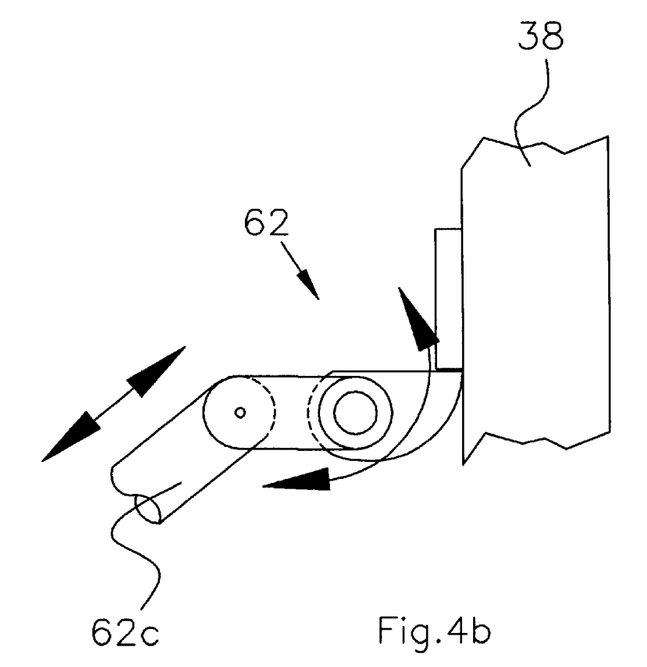
FIG. 4b is a side view depicting the conceptual operation of the locking means to prevent hydraulic creep in a locked-in position.
Figure 4C:
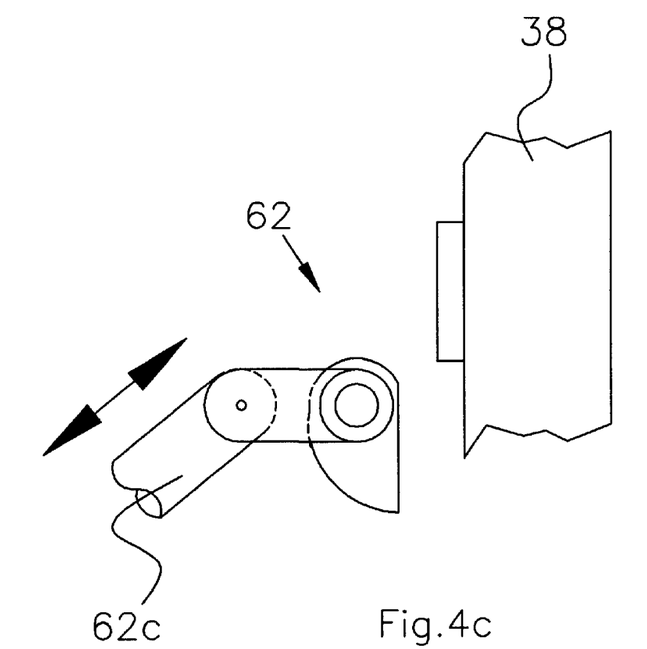
FIG. 4c is a side view of the FIG. 4b depiction in an unlocked position.

Because the lifting portion of the invention typically operates with hydraulic actuation, it is often experienced that when in an elevated position, especially when a load is being applied, that hydraulic creep occurs. To prevent this, it is recommended that the elevator means 36 further have locking means 62 for preventing the hydraulic creeping of the generally planar platform 46 downward when said generally planar platform 46 is in the elevated position. One method of providing the locking means 62 is to have a mast cross tie plate 62a and a releasable latching cam 62b attached to the linear actuator 62c of the elevator means 36. As shown in FIGS. 4a–4c, the latching cam 62b engages the cross tie plate 62a so as to prevent the mast from lowering.

When the operator wants to lower platform 46, the operator need only release the latching cam 62*b* to disengage it from cross tie plate 62*a*.

Generally, the mast portion of the elevator means 36 is very similar to a forklift except in reverse in the sense that the controls and base frame are attached at a higher level near the loading end of the ramp 28 and the mast lowers to the ground or tarmac surface. Although this portion of the invention may be operated with gas power as many forklifts do, it is preferable that the invention 10 be powered electrically. It is anticipated that such systems could be powered with 110v, 360v, 480v 3 phase, solar powered DC operated 12v or 24v. As shown in FIG. 4*a*, one application would incorporate mounting the motor, battery, hydraulic pump/reservoir to the frame structure of the elevator means 36. The equipment could be mounted as well on a frame portion extending from behind the mast portion of elevator means 36. Although, this operating equipment may optionally be mounted in front of the mast in a location that would not interfere with objects being elevated on platform 46. Certainly, additional accessories, such as lights, can be mounted from the frame 38 and powered with the chosen source of power, if required.

Now referring to the inclined ramp 28 portion of the invention 10, the unloading end 34 of the inclined ramp 28 typically has side access means 64 for removing the other article 22 from the inclined ramp 28. The side access means 64 is in most cases provided by the absence of a section of the side wall 48.

The unloading end 34 of the inclined ramp 28 also preferably includes an article stop 66 extending substantially across said inclined ramp 28. The article stop 66 is located downstream of the side access means 64 for removing the other article 22 from the inclined ramp 28. The article stop 66 should be made with a flexible material such as rubberized material so as to absorb the impact shock of sliding articles 22. Typically, rubber reinforced material such as impregnated fibrous metallic or polymeric material can be used as a shock absorbing gate.

The unloading end 34 should have ground engagement wheels 68 coupled to the inclined ramp 28 at its unloading end 34 for facilitating ground movement of the lift and baggage ramp 10 as the elevated passenger walkway/bridge 14 is maneuvered into position.

Although the generally planar conveyance surface 30 may be essentially a flat surface, it is preferable, especially for rain water drainage that the conveyance surface 30 include a longitudinally oriented channel corrugated surface 70 defining rain water runoff paths between upper surfaces of the channel corrugated surface 70.

Surface 70 may be made from a corrugated sheet metal having a plurality of channels extending along the length of the conveyance surface 70; however, other materials for the floor member are contemplated herein. Further as stated above, the surface 70 preferably incorporates means for providing a drain so as to allow water to pass through the conveyance surface 70. The corrugated channel forming the conveyance surface 70 provides for drainage of rain water along the valleys 70*a* of the channels as depicted in FIG. 3. An additional benefit to using a corrugated channel is that the upper surface of the conveyance surface 70 has less surface area in direct contact with a sliding article 22, thereby lessening the amount of surface area friction between the article sliding down the inclined ramp and the ramp surface. This benefit resultantly enhances and facilitates the sliding of the articles 22 down the ramp 28.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

Now that the invention has been described,
What is claimed is:

1. A lift and baggage ramp for a movable elevated passenger walkway/bridge having attached to said movable elevated passenger walkway/bridge an auxiliary access stairway extending downwardly on an incline from the movable elevated passenger walkway/bridge to the tarmac, the auxiliary access stairway having an upper portion landing platform for facilitating access for airline service employees to and from the elevated passenger walkway/bridge from and to the tarmac, the lift and baggage ramp comprising:

elevator means for lowering and lifting an article, the elevator means including a frame from which a loading end of an inclined ramp is pivotally attached to a portion of said frame, the frame of said elevator means further having cantilevered attachment and support means for fixing said frame of said elevator means to a movable elevated passenger walkway/bridge, the cantilevered attachment and support means extending from said elevated passenger walkway/bridge adjacent an underneath side of an auxiliary access stairway's upper portion landing platform to said frame;

the elevator means including a generally planar platform for loading the article, wherein the planar platform is capable of being lifted from the tarmac to a level which approximately coincides with the upper portion landing platform of the auxiliary access stairway and wherein the planar platform is capable of being lowered from the level which approximately coincides with the upper portion landing platform of the auxiliary access stairway down to the tarmac;

the inclined ramp including an unloading end resting on a tarmac surface with a generally planar conveyance surface extending between the unloading end and the loading end for the sliding conveyance of another article from said loading end to said unloading end;

the inclined ramp being disposed near and generally parallel to the auxiliary access stairway; and the inclined ramp further including upstanding side walls generally along each edge of the generally planar conveyance surface, the upstanding side walls being means for preventing the sliding article from falling off the generally planar conveyance surface.

2. The lift and baggage ramp according to claim 1, wherein the generally planar platform further comprises:

a raised edge along a side of said generally planar platform furthest away from said upper portion landing platform of the auxiliary access stairway when said generally planar platform is the elevated position.

3. The lift and baggage ramp according to claim 1, wherein the generally planar platform further comprises:

a generally tapered raised portion along a side of said generally planar platform furthest away from said upper portion landing platform of the auxiliary access stairway when said generally planar platform is the elevated position.

4. The lift and baggage ramp according to claim 1, wherein the generally planar platform further comprises:

a raised edge along a side of said generally planar platform adjacent said upper portion landing platform of the auxiliary access stairway when said generally planar platform is the elevated position.

5. The lift and baggage ramp according to claim 1, wherein the generally planar platform further comprises:

a generally tapered raised portion along a side of said generally planar platform adjacent said upper portion landing platform of the auxiliary access stairway when said generally planar platform is the elevated position.

6. The lift and baggage ramp according to claim 1, wherein the elevator means further comprises:

a generally planar member pivotally attached to a side of the generally planar platform of the elevator means, the pivotal attachment being on the side adjacent the loading end of the inclined ramp when said generally planar platform is in the elevated position; and the generally planar member being capable of pivoting from a generally vertical orientation down toward the generally planar platform to one of a generally horizontal orientation parallel to the generally planar platform and an inclined orientation above the generally planar platform, wherein when said generally planar platform is lifted to the level coinciding with the upper portion landing platform of the auxiliary access stairway, the generally planar member may be selectively lowered to the horizontal or inclined orientation or remain in the vertical orientation, and wherein the generally planar member when in the vertical orientation further serves as a guard to prevent the article being elevated from falling off the generally planar platform.

7. The lift and baggage ramp according to claim 6, wherein the elevator means further comprises:

means for maintaining the generally planar member in the vertical orientation; and means for maintaining the generally planar member in the one of the horizontal orientation and inclined orientation.

8. The lift and baggage ramp according to claim 6, wherein the generally planar member includes handle means for facilitating the selective positioning of the generally planar member in the one of the horizontal and inclined orientations or the vertical orientation.

9. The lift and baggage ramp according to claim 1, wherein the elevator means further comprises:

locking means for preventing the hydraulic creeping of the generally planar platform downward when said generally planar platform is in the elevated position.

10. The lift and baggage ramp according to claim 1, wherein the unloading end of the inclined ramp has side access means for removing the other article from the inclined ramp.

11. The lift and baggage ramp according to claim 10, wherein the unloading end of the inclined ramp further comprises:

an article stop extending substantially across said inclined ramp, said article stop further being located downstream of said side access means for removing the other article from the inclined ramp.

12. The lift and baggage ramp according to claim 11, wherein the article stop is adapted to absorb the impact shock of the sliding other article.

13. The lift and baggage ramp according to claim 12, wherein the article stop is a rubber reinforced gate.

14. The lift and baggage ramp according to claim 1, wherein the unloading end further comprises:

ground engagement wheels coupled to the inclined ramp at said unloading end for facilitating ground movement of the lift and baggage ramp as the elevated passenger walkway/bridge is maneuvered into position.

15. The lift and baggage ramp according to claim 1, wherein the generally planar conveyance surface comprises:

a longitudinally oriented channel corrugated surface defining rain water runoff paths between upper surfaces of the channel corrugated surface.

* * * * *